H. WYMAN.
PHOTOGRAPH FILM PACKAGE.
APPLICATION FILED JUNE 12, 1913.
1,101,231.
Patented June 23, 1914.
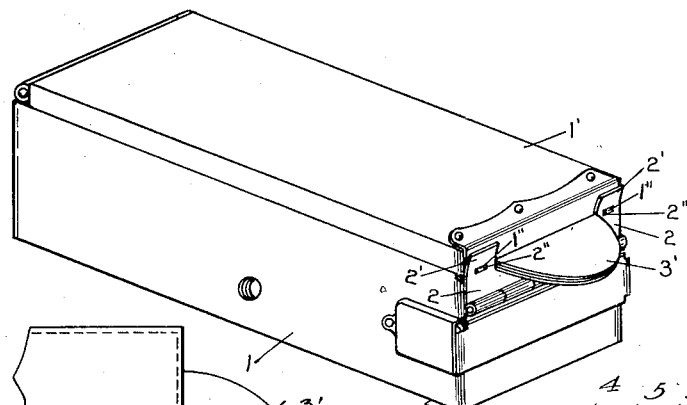
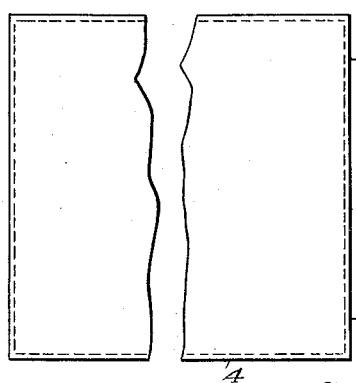
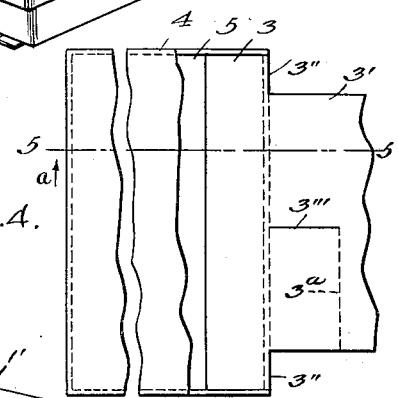
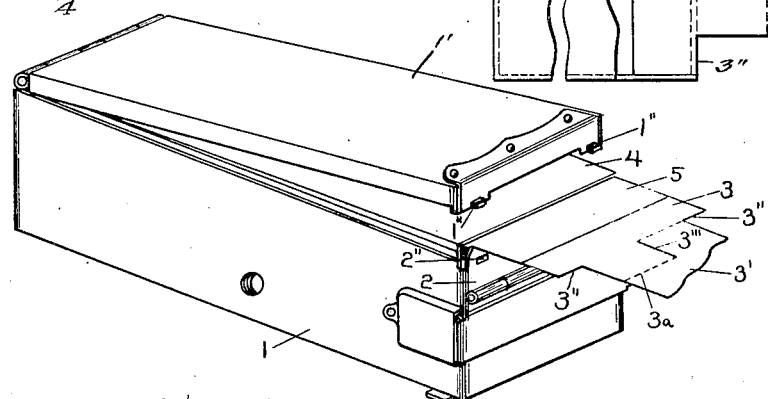
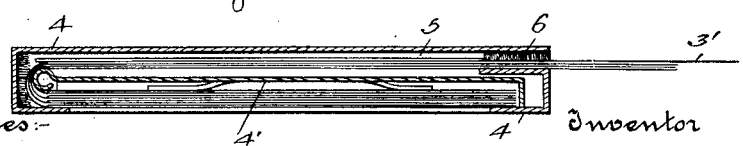
Witnesses:—
E. R. Llewellyn
W. Haas.
Inventor
Horace Wyman
By John E. Dewey
Attorney

UNITED STATES PATENT OFFICE.

HORACE WYMAN, OF WORCESTER, MASSACHUSETTS.

PHOTOGRAPH-FILM PACKAGE.

1,101,231.   Specification of Letters Patent.   Patented June 23, 1914.

Application filed June 12, 1913. Serial No. 773,166.

*To all whom it may concern:*

Be it known that I, HORACE WYMAN, a citizen of the United States, residing at Worcester, in the county of Worcester and State of Massachusetts, have invented certain new and useful Improvements in Photograph-Film Packages, of which the following is a specification.

My invention relates to cameras, and to photograph film packages, of the type in which the package is carried in the camera, and each film separately exposed and moved into a light excluding storage chamber in the package, and afterward the package removed from the camera, or adapter, for development. Each film is provided with a backing, and with a tab having stop shoulders at its sides, which extends through the storage chamber and out through an opening in the front, and by means of which each film is drawn into the storage chamber after exposure.

The object of my invention is to improve upon the construction of film packages of the type referred to, and more particularly to provide means, whereby one or more of the exposed films may be withdrawn from the storage chamber, and arrested by stop shoulders contacting with the projections on the movable hinged part on the front end of the camera, for holding the cover of the camera case closed, when said cover is closed without removing the package from the camera in which the exposure was made, or from the adapter, if one is used, as will be hereinafter fully described.

Referring to the drawings:—Figure 1 is a perspective plan view of a camera containing a film package embodying my improvements. Fig. 2 corresponds to Fig. 1, but shows the back of the camera partially open, and a film and backing partially withdrawn. Fig. 3 is a plan view of a film package embodying my improvements. Fig. 4 corresponds to Fig. 3, but shows a part of the package at the end partially broken away, and the film backing partially withdrawn therefrom, and, Fig. 5 is a section, on line 5, 5, Fig. 4, looking in the direction of arrow $a$, same figure; the part broken away in Fig. 4 is shown in Fig. 5.

In the accompanying drawings, 1 is a camera case, which contains the film package, 1' is the cover or lid, hinged at one end, and adapted to be raised at its other end, for the placing of a film package within a recess in the camera. At the free end of the cover 1', on the front edge, are in this instance two small projections 1''. On the front edge of the body of the camera 1 is the spring actuated hinged part 2, which is adapted to be moved outwardly on its hinge joint, and is held in its inward position by a spring, not shown. The part 2 has two extensions or projections 2' thereon, in the line of movement of the shoulder 3'' of the tabs forming stops or abutments, and each projection has an opening 2'' therethrough, which openings engage the projections 1'' on the front edge of the cover 1', forming catches to hold the cover closed. The tabs 3' on the film backing 3 extend through an opening at the front of the camera case, and between the two projections 2' on the hinged part 2, as shown in Fig. 1.

The film package 4, Figs. 3, 4, and 5, is made of paste-board, or other suitable material, and provided with an exposure chamber in the lower part thereof, in the usual way, as shown in Fig. 5, for the films. Each film 5 has a paper backing sheet 3, and a withdrawing tab 3', and stop shoulders 3''. In the package case, back of the exposure chamber, is a dark storage chamber, in which there are no abutments provided to arrest the film when drawn therein and there is a partition 4' between the two chambers, and the exposed films are drawn around the end of the partition into the storage chamber, by the back sheet 3 having its tab 3' pass through the storage chamber and project out of the package through an opening in the front end, as shown in Fig. 5. Light excluding material 6 extends within the front part of the package 4. The tabs 3' are of less width than the backings 3 and the films 5, and a shoulder 3'' is left at each side of the tab 3', in advance of the film, leaving a space between the shoulders and the film for the light excluding material. The tabs 3', when the film package 4 is in the recess in the camera, with the lid 1' closed, as shown in Fig. 1, will project through an opening below the lid, and after the exposure is made, and the film is drawn into the storage chamber, by drawing out the tab 3', the shoulders or projections 3'' on the backing 3, will pass the light excluding material and move out of the package, and engage the projections or abutments 2' on the hinged part 2, and the further withdrawal of the backing and the film will be arrested by said projections or abutments, on each side of the camera, and independent of the film package, when the hinged lid 1' of the camera 1 is closed, as shown in Fig. 1.

By raising the hinged lid 1' of the camera 1, or of an adapter, in case an adapter is used, the open end of the film package 4 can be raised out of the recess in the camera, to bring the shoulders 3'' on the backing 3 above the projections or abutments 2' on the hinged part 2 of the camera, as shown in Fig. 2, and the exposed film can then be withdrawn from the package; this should be performed in the dark.

In some makes of cameras, and adapters, parts of their bodies are in the line of movement of the shoulders on the tabs, and in such instances, will act as abutments to arrest the withdrawal of the film and backing instead of the hinged part 2, as in the camera above described. In my improved construction, there are no abutments or other obstructions on the film package, to prevent the free withdrawal, through the opening in the front of the package, of an exposed film, when the package is out of the camera. It will thus be seen that the package having its exposure chamber provided with sensitized films and backings therefor, and with tabs from the backings passing through and out of the dark storage chamber which has a clear and unobstructed opening throughout its length and out at the front end, that any of the films in the exposure chamber can be drawn into the storage chamber and out at the front end, without hindrance from any obstruction in the package, when the lid of the camera is raised, and the front end of the film package 4 is raised out of the camera, and the projections 2' on the hinged part 2, will not extend in the path of the stop shoulders 3'' on the film 5, as shown in Fig. 2. When the package is within the camera, the abutments on the camera prevent the withdrawal of the exposed film therefrom.

It will be understood that the details of construction of my improvements may be varied if desired.

Having thus described my invention, what I claim as new and desire to secure by Letters Patent is:—

1. The combination with a camera, having a recess, and a hinged cover therefor, to receive a photograph film package, said recess having an opening under the cover at the front, for the projecting tabs of said package, and abutments at the sides of the opening, of a film package, adapted to be carried in said recess, and having a storage chamber for exposed films with an unobstructed space through to the front of the chamber for the film backing, and projecting tabs, said tabs having stop shoulders on their edges, near the film, said shoulders adapted to be arrested by the abutments on the camera, as the tabs pass out of the package, when the film is fully drawn into the storage chamber.

2. A photograph film package, having a dark storage chamber for exposed films, and an opening at the front for the projecting tabs of the film backing, said tabs having stop shoulders near the film, and said chamber having a clear and unobstructed space throughout its length, and through the opening, in combination with a camera, or adapter, having a recess, with a lid, for the reception of said film package, an opening at the front of the recess for the projecting tabs, and abutments, carried on the camera, in the line of movement of the stop shoulders on the tabs, when said tabs are being drawn out.

3. A photograph film package, having exposure and storage chambers, and sensitized films therein, with backings, and withdrawing tabs having stop shoulders on their edges, near the films, and an opening at the front of the storage chamber, for the tabs to project through, and light excluding material inside of the opening, in combination with a camera, having a recess to receive said package, and having an opening for the film tabs of the package, and having abutments at the sides of said opening, whereby an exposed film being withdrawn into the storage chamber, will have the light excluding material between the films, and stop shoulders arrested by the abutments outside of the package.

4. A photograph film package having a dark storage chamber with no abutments therein to arrest the film when drawn therein, and an exposure chamber, and films therein, having backings and tabs, said tabs passing through the storage chamber and projecting out of an opening at the front thereof, said opening provided with light excluding material contacting with the tabs, whereby when the exposed film is fully drawn into the storage chamber, the light excluding material will contact with the tab.

5. A photograph film package provided with sensitized films, each having a backing, and a withdrawing tab, said package having a dark storage chamber through which said tabs pass, said chamber without abutments therein to arrest the film when drawn therein, with a clear and unobstructed opening the whole width of the film at the front of the package, for the removal of the film therethrough, and light excluding material inside of said opening.

6. A photograph film package having an exposure chamber for sensitized films and backings therefor, a dark storage chamber through which a tab passes from each of the backings in the exposure chamber, said storage chamber having a clear and uninterrupted passage from the exposure chamber throughout its length, and out of the front end, for the withdrawal of the films into and out of the storage chamber by the said tabs.

HORACE WYMAN.

Witnesses:
JOHN C. DEWEY,
MINNA HAAS.

Copies of this patent may be obtained for five cents each, by addressing the "Commissioner of Patents, Washington, D. C."